Figure 1:
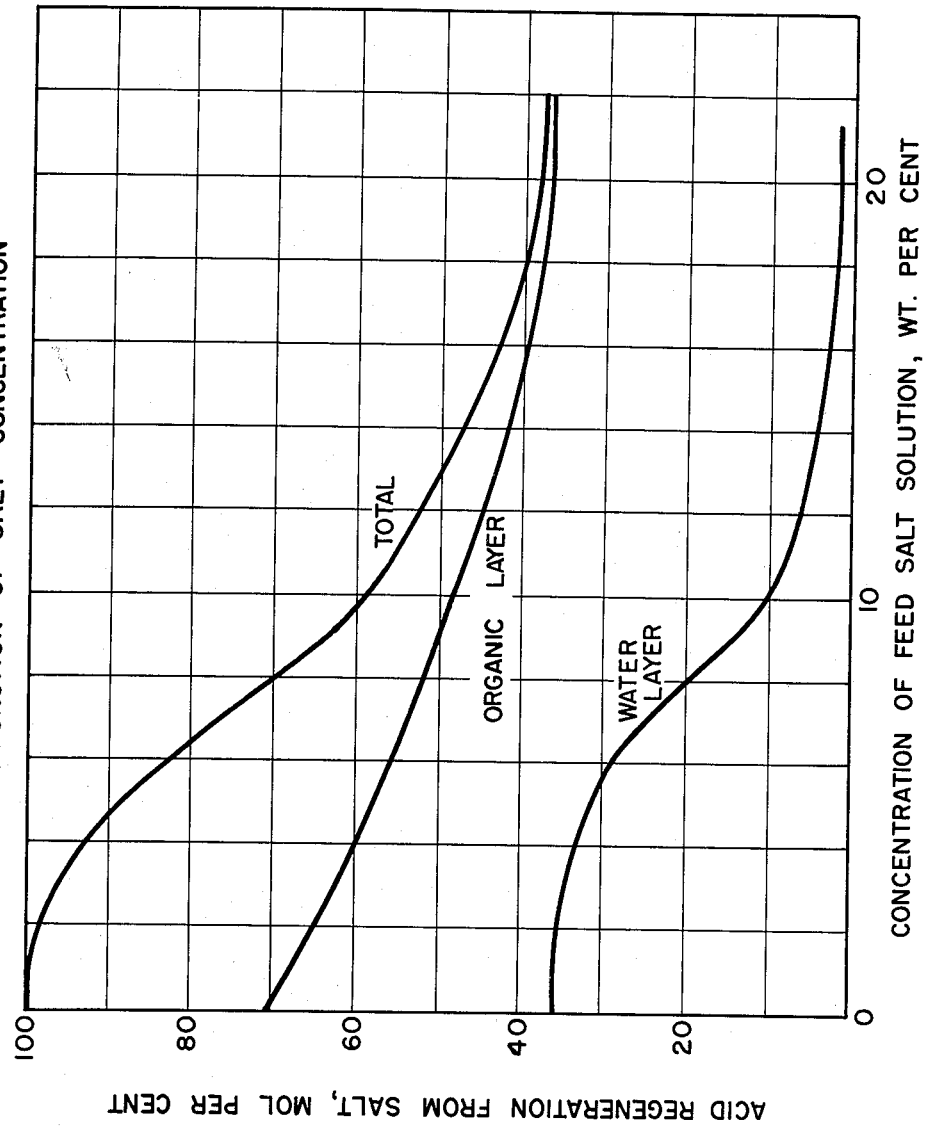

United States Patent Office 2,742,490
Patented Apr. 17, 1956

2,742,490

USE OF CARBON MONOXIDE FOR REGENERATION OF ACIDS FROM THEIR SALTS

Buell O'Connor and Alfred Steitz, Jr., Tulsa, Okla., assignors to Stanolind Oil and Gas Company, Tulsa, Okla., a corporation of Delaware Application November 10, 1952, Serial No. 319,767

12 Claims. (Cl. 260—450)

Our invention relates to an improved method for recovering carboxylic acids from complex mixtures thereof. More particularly, it pertains to a process for recovering a wide range of carboxylic acids from various hydrocarbon mixtures thereof, for example, from the raw synthesis oil obtained by the reduction of carbon monoxide with hydrogen over an iron catalyst.

While the present invention obviously is applicable to the recovery of acids from numerous types of crude mixtures, this description will be confined largely to the use of such invention in connection with the recovery of carboxylic acids from the oil phase produced in hydrocarbon synthesis.

Previously, it was proposed to recover the acid components from the hydrocarbon synthesis oil by first adding a suitable base such as caustic to the crude mixture to convert the acids contained therein to their corresponding salts. As a result of the neutralization step, an aqueous phase or layer containing the acids in the form of their dissolved salts and an oil layer were formed, the aqueous phase being withdrawn and nonacid impurities removed therefrom by means of distillation. This purified salt solution was then acidified with a suitable mineral acid, such as sulfuric acid, and the carboxylic acids liberated. The acid layer was then washed with water and thereafter further processed by distillation or other suitable means. Such a procedure for recovering carboxylic acids from mixtures of the above type possesses the major disadvantage that it consumes substantial quantities of caustic, or other alkaline material, and mineral acid. Furthermore, a by-product salt solution is produced in the process which presents a disposal problem.

Accordingly it is an object of our invention to provide a novel process whereby a carboxylic acid or a mixture thereof can be liberated from the corresponding salts by the use of carbon monoxide as the regenerative agent. It is a further object to provide improved conditions for the liberation of carboxylic acids from their salts by the use of carbon monoxide involving the utilization of relatively dilute salt solutions from which the acids are to be recovered. It is a still further object to provide a method for liberating carboxylic acids from salt solutions having a relatively wide concentration range embodying the use of a combination multi-stage extraction and regeneration unit wherein said salt solutions are contacted with carbon monoxide under elevated temperatures and pressures and the resulting acids extracted by the means of a substantially water immiscible selective solvent for said acids.

We have now found that while the proportion of acids liberated by the use of carbon monoxide from concentrated (30 to 50 weight per cent) salt solutions of the type contemplated herein is relatively low (not substantially in excess of about 30 mol per cent), the percentage of acids liberated by this procedure can be materially increased by diluting the aforesaid concentrated salt solutions down to not more than about 10 weight per cent. Under such conditions we have found that as much as 58 mol per cent of the acids can be recovered in a single pass. In general the process of our invention involves first neutralizing the acids present in the raw synthesis oil stream with an aqueous solution of a suitable base such as, for example, an alkali metal hydroxide, carbonate, or bicarbonate. The resulting salts separate into a lower aqueous phase which is sent to a stripping column where dissolved nonacid chemicals and hydrocarbon impurities are removed overhead leaving a purified solution of carboxylic acid salts. In accordance with one embodiment of our invention this aqueous solution of salts is diluted to a salt concentration of from about 2 to about 10 weight per cent after which an excess of carbon monoxide over that required to liberate the corresponding acids is introduced. The resulting mixture is next heated to a temperature of from about 150° to about 250° C., preferably from about 180° to about 220° C. at carbon monoxide partial pressures ranging from about 500 to about 1500 p. s. i. g., and preferably from about 800 to about 1400 p. s. i. g. After liberation of the acids has ceased, as evidenced by a leveling off of pressure within the reaction vessel, the aqueous mixture of free acids and unconverted salts is removed and allowed to stratify into two layers, the upper one of which consists of substantially water-insoluble acids. The lower aqueous layer contains an appreciable quantity (15 to 30 weight per cent) of water-soluble acids which may be recovered either by means of steam distillation or by extraction with a selective solvent such as, for example, methyl isobutyl ketone, ethyl acetate, heptane, etc., or a mixture of two or more of such solvents. The acids can then be recovered from the resulting extract by means of simple fractional distillation of the latter.

By the use of a suitable solvent such as any one of those just mentioned or a mixture thereof, we have also found that it is possible to increase the total quantity of acids liberated by the action of carbon monoxide on either dilute or relatively concentrated salt solutions. This result is accomplished by merely conducting the acid liberation step in the presence of a solvent. In the case of more concentrated salt solutions, the acid liberation step should be effected in a multi-stage extraction column adapted for high pressure operation.

In connection with the foregoing discussion, Figure 1 of the accompanying drawings clearly shows the extent of acid regeneration from salt solutions of the type herein specified to be a function of the salt concentration present in such solutions. The data which form the basis for the curves shown in Figure 1 were obtained by employing the concentrations of salt solutions listed and a temperature of 200° C., a carbon monoxide partial pressure of 1200 p. s. i. g., and in the presence of from about 12 to 15 weight per cent of heptane based on the weight of the salt solution. The acids shown to be present in the water layer after regeneration may be recovered as previously indicated by means of a simple stripping operation or may be removed by extraction with a suitable solvent. In the case of a combination multi-stage extraction and regeneration step, as will be described in greater detail below, the acid content of the water layer (raffinate phase) is extremely low and can be disregarded. When regenerating acids from either dilute or relatively concentrated solutions, such solutions may be introduced into a suitable extraction tower at a point near the top thereof and countercurrently contacted with gaseous carbon monoxide and liquid solvent. The acids as liberated are taken up by the solvent, withdrawn from the top of the extractor and recovered from the solvent by means of fractional distillation. During the acid regeneration step, sodium formate is produced and is found in substantial quantities in the aqueous raffinate together with some dissolved solvent which may be recovered by distillation. The aqueous residue resulting from removal of solvent from the raffinate may be further concentrated and the sodium formate purified. Alternatively, the sodium formate thus obtained may be thermally decomposed, if desired, into sodium oxalate or sodium carbonate in accordance with the respective equations:

(1) $\quad 2HCOONa \rightarrow (COONa)_2 + H_2$
(2) $\quad 2NaOOCH \rightarrow Na_2CO_3 + CO + H_2$ If sodium oxalate is the desired end product, the sodium formate should be heated to from about 389° to about 400° C. in the absence of alkali. To obtain predominantly sodium carbonate, as represented by Equation (2), sodium formate is heated to a temperature of from about 210° to about 330° C. in the presence of from about 1 to about 3 weight per cent sodium hydroxide. The sodium formate thus produced also may be used as a convenient source of formic acid.

By converting the sodium formate thus produced into sodium carbonate, carbon monoxide, and hydrogen, a substantial quantity if not all of the materials required in the recovery of the acids from crude hydrocarbon mixtures of the aforesaid type can be supplied by the process itself, thus making possible a cyclic method for acid neutralization and regeneration. If, for various reasons, it is not desired to treat the sodium formate thus produced, it may be converted as indicated above into sodium oxalate, a product of appreciable market value.

Figure 2:
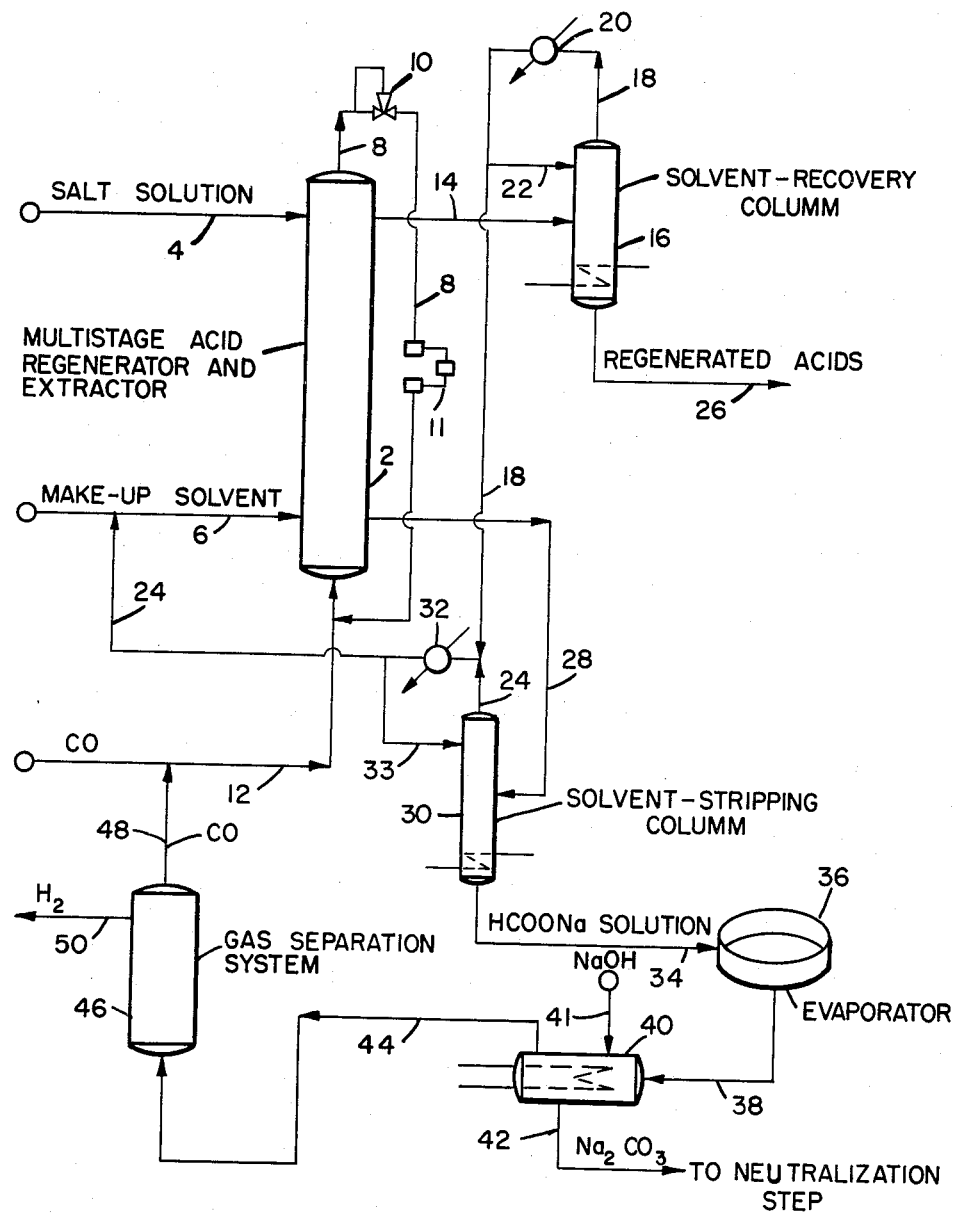

A preferred embodiment of my invention is further illustrated by the flow diagram of Figure 2 wherein a 5 to 10 weight per cent aqueous solution of sodium fatty acid salts, derived by neutralizing with caustic the free acids present in raw hydrocarbon synthesis oil are introduced into a combination multi-stage regeneration and extraction tower 2 through line 4 where said solution is countercurrently contacted with an excess of substantially pure carbon monoxide at a temperature of about 200° C. and at a pressure of about 1400 p. s. i. a. n-Heptane is added at a point near the bottom of tower 2 through line 6 at a rate sufficient to produce a solvent concentration within the tower corresponding to a solvent-to-salt solution ratio of from about 1:1 to about 3:1. Within the extraction tower or column, the acids are regenerated from their salts and are removed from the aqueous phase by the upwardly flowing stream of heptane. From the top of the tower unreacted carbon monoxide is withdrawn through line 8 and pressure reduction valve 10 and returned to the acid regeneration step via compressor 11 and line 12 through which make-up carbon monoxide is added to the system. Heptane containing free acids is removed from the column through line 14 and introduced into solvent recovery column 16. The solvent is taken overhead through line 18 and condenser 20, and a portion of the condensate returned to the column as reflux through line 22. The remainder of the distillate is combined with the solvent stream in line 24 and returned to the extraction column via line 6. Product acids are withdrawn from column 16 through line 26. From the bottom of tower 2 is withdrawn through line 28 in aqueous raffinate stream containing dissolved solvent and sodium formate. This stream is run into solvent stripping column 30 where the solvent is stripped from the sodium formate solution and taken off through line 24, condenser 32, and combined with make-up solvent in line 6. A portion of the overhead is returned to the column as reflux through line 33. A relatively dilute stream of sodium formate is withdrawn through line 34 and sent to evaporator 36 where substantially dry sodium formate is obtained after which it is transferred through line 38 into a heating unit 40. The dry sodium formate is mixed with from about 1 to about 3 weight per cent of powdered sodium hydroxide added through line 41 and heated to a temperature of from about 250° to about 300° C. whereupon sodium carbonate, carbon monoxide, and hydrogen are produced as decomposition products. Sodium carbonate is withdrawn through line 42 and may be used in the neutralization of the crude acids present in the oil fraction from hydrocarbon synthesis to produce the aqueous salt stream in line 4. Carbon monoxide and hydrogen are taken off heating unit 40 and sent to a suitable gas separation system 46 through line 44.

The means by which carbon monoxide and hydrogen are separated from one another may be based on any of several available methods. For example, the system employed for the purification of hydrogen for ammonia synthesis, wherein the hydrogen is derived from natural gas, is satisfactory for the purposes of our invention. Briefly, in systems of this type a gaseous mixture of carbon monoxide and hydrogen is contacted with a series of fixed beds of mixed cupric and cuprous formates under mild conditions of temperature and pressure. Carbon monoxide is selectively removed from the gas stream by reaction with the aforesaid formates to yield a complex which can be readily decomposed by treatment with steam. Accordingly, as shown in the drawing, carbon monoxide in substantially pure form is withdrawn through line 48 and combined with the stream thereof in line 12. Hydrogen is taken off through line 50. It should be pointed out, however, that the carbon monoxide used in our process need not be completely free of hydrogen; and, if desired, carbon monoxide-hydrogen mixtures of the type produced by the gasification of coal or by the partial combustion of methane may be employed.

From the foregoing description it will be apparent that a novel and practical procedure has been provided for the regeneration of fatty acids from their salts and that such procedure is applicable to a wide variety of carboxylic acid salts or mixtures thereof. Also it will be evident to those skilled in the art to which the present invention relates that the latter is susceptible of numerous modifications without departing from the scope thereof. In general it may be said that our invention contemplates the use of carbon monoxide as an agent for the regeneration of fatty acids from aqueous solutions thereof under the conditions defined herein.

What we claim is:

1. In a process for regenerating carboxylic acids from an aqueous solution of their salts, the improvement which comprises countercurrently contacting carbon monoxide with said solution in a combination multi-stage extraction and acid regeneration zone at a temperature from about 150° to about 250° C. and at a carbon monoxide partial pressure ranging from about 500 to about 1500 p. s. i. g. in the presence of a substantially water-immiscible solvent for the acids thus liberated, said carbon monoxide being employed in amounts greater than that stoichiometrically required to liberate said acids from their salts, and thereafter withdrawing from said zone said solvent having regenerated carboxylic acids dissolved therein.

2. The process of claim 1 in which the carboxylic acids are regenerated from an aqueous solution of their alkali metal salts.

3. The process of claim 2 in which the alkali metal salt solution employed is derived from the neutralization of the acids present in hydrocarbon synthesis oil.

4. The process of claim 2 in which the alkali metal salt solution employed is derived from the neutralization of the acids present in hydrocarbon synthesis oil, and the carbon monoxide partial pressure employed ranges from about 800 to about 1400 p. s. i. g.

5. In a process for regenerating carboxylic acids, including substantially water-immiscible acids, from an aqueous solution of their alkali metal salts, the improvement which comprises contacting carbon monoxide with said aqueous solution wherein the salt concentration thereof is not greater than about 10 weight per cent at a temperature of from about 150° to about 250° C. and at a carbon monoxide partial pressure of from about 500 to about 1500 p. s. i. g., said carbon monoxide being employed in amounts greater than that stoichiometrically required to liberate said acids from their salts, allowing the substantially water-immiscible acids thus regenerated to collect in the form of an upper layer, and recovering the latter.

6. In a process for regenerating carboxylic acids from an aqueous solution of their alkali metal salts, the improvement which comprises countercurrently contacting carbon monoxide with said solution, wherein the salt concentration of said solution is not greater than about 10 weight per cent, in a combination multi-stage extraction and acid regeneration zone at a temperature from about 150° to about 250° C. and at a carbon monoxide partial pressure ranging from about 500 to about 1500 p. s. i. g. in the presence of a substantially water-immiscible solvent for the acids thus liberated whereby an alkali metal formate is produced, said carbon monoxide being employed in amounts greater than that stoichiometrically required to liberate said acids from their salts, withdrawing from said zone said solvent having regenerated carboxylic acids dissolved therein, withdrawing an aqueous raffinate phase containing said alkali metal formate, recovering the latter therefrom, thermally decomposing said formate into sodium carbonate, carbon monoxide and hydrogen, separating carbon monoxide from hydrogen and returning the carbon monoxide thus recovered to said multi-stage extraction and acid regeneration zone.

7. The process of claim 6 in which the alkali metal salt solution employed is derived from the neutralization of the acids present in hydrocarbon synthesis oil, and the carbon monoxide partial pressure ranges from about 800 to about 1400 p. s. i. g.

8. In a process for recovering carboxylic acids from a crude mixture thereof involving the neutralization of said acids with an alkali metal base to form an aqueous solution of the corresponding alkali metal salts of said acids, separating the latter from said crude mixture and thereafter regenerating the acids from said salts, the improvement which comprises countercurrently contacting carbon monoxide with said aqueous salt solution, wherein the salt concentration of the latter is not greater than about 10 weight per cent, in a combination multi-stage extraction and acid regeneration zone at a temperature from about 150° to about 250° C. and at a carbon monoxide partial pressure ranging from about 500 to about 1500 p. s. i. g. in the presence of a substantially water-immiscible solvent for the acids thus liberated whereby an alkali metal formate is produced, said carbon monoxide being employed in amounts greater than that stoichiometrically required to liberate said acids from their salts, withdrawing from said zone said solvent having regenerated carboxylic acids dissolved therein, withdrawing an aqueous raffinate phase containing said alkali metal formate, recovering the latter therefrom, thermally decomposing said formate into sodium carbonate, carbon monoxide and hydrogen, separating carbon monoxide from hydrogen and returning the sodium carbonate to the above-mentioned neutralization step.

9. The process of claim 8 in which the crude mixture employed is a hydrocarbon solution of the carboxylic acids.

10. The process of claim 8 in which the crude mixture of carboxylic acids consists of raw hydrocarbon synthesis oil.

11. In a process for regenerating carboxylic acids from an aqueous solution of their alkali metal salts, the improvement which comprises countercurrently contacting carbon monoxide with said solution, wherein the salt concentration of said solution is not greater than about 10 weight per cent, in a combination multi-stage extraction and acid regeneration zone at a temperature of from about 150° to about 250° C. and at a carbon monoxide partial pressure ranging from about 500 to about 1500 p. s. i. g. in the presence of a substantially water-immiscible solvent for the acids thus liberated whereby an alkali metal formate is produced, said carbon monoxide being employed in amounts greater than that stoichiometrically required to liberate said acids from their salts, withdrawing an aqueous raffinate phase containing said alkali metal formate, recovering the latter therefrom, thermally decomposing said formate into sodium carbonate, carbon monoxide and hydrogen, separating carbon monoxide from hydrogen and returning the carbon monoxide thus recovered to said multi-stage extraction and acid regeneration zone.

12. In a process for regenerating carboxylic acids from an aqueous solution of their alkali metal salts, the improvement which comprises countercurrently contacting carbon monoxide with said solution, wherein the salt concentration of said solution is not greater than about 10 weight per cent, in a combination multi-stage extraction and acid regeneration zone at a temperature of from about 150° to about 250° C. and at a carbon monoxide partial pressure ranging from about 500 to about 1500 p. s. i. g. in the presence of a substantially water-immiscible solvent for the acids thus liberated whereby an alkali metal formate is produced, said carbon monoxide being employed in amounts greater than that stoichiometrically required to liberate said acids from their salts, withdrawing an aqueous raffinate phase containing said alkali metal formate, recovering the latter therefrom, and thermally decomposing said formate into sodium carbonate, carbon monoxide and hydrogen.

References Cited in the file of this patent

UNITED STATES PATENTS 820,374   Weise et al. _____ May 8, 1906

OTHER REFERENCES

Dumas et al.: Beilstein (Handbuch, 4th ed.), vol. 2, p. 11 (1920).